(12) United States Patent
Sinclair et al.

(10) Patent No.: US 7,539,487 B2
(45) Date of Patent: May 26, 2009

(54) INTERFACING I/O DEVICES WITH A MOBILE SERVER

(75) Inventors: Michael J. Sinclair, Kirkland, WA (US); Ray A. Bittner, Jr., Redmond, WA (US); Lin Zhong, Houston, TX (US)

(73) Assignee: Microsoft Corporation, Redmond, WA (US)

(*) Notice: Subject to any disclaimer, the term of this patent is extended or adjusted under 35 U.S.C. 154(b) by 571 days.

(21) Appl. No.: 11/275,489

(22) Filed: Jan. 9, 2006

(65) Prior Publication Data

US 2007/0162576 A1    Jul. 12, 2007

(51) Int. Cl.
*H04M 3/00* (2006.01)
(52) U.S. Cl. ........................ 455/419; 709/223; 709/201; 709/249
(58) Field of Classification Search ................ 455/410, 455/411, 41.1, 41.2, 574
See application file for complete search history.

(56) References Cited

U.S. PATENT DOCUMENTS

2003/0114106 A1* 6/2003 Miyatsu et al. ............... 455/41
2006/0089119 A1* 4/2006 Lipasti et al. ............... 455/410

OTHER PUBLICATIONS

Yuan et al. (Yuan) "Developing Scalable Series 40 Applications: A Guide for Java Developers".*
Fishkin et al., "User Interface Components for Lightweight WPANs", IEEE Pervasive Computing Special Issue, Jul. 1, 2002, 11 pages.
Hutterer, et al., "Lightweight User Interfaces for Watch Based Displays", Australian Computer Society, Inc., 2005, 10 pages.
Zhong et al., "A Personal-Area Network of Low-power Wireless Interfacing Devices for Handhelds System & Hardware Design", MobileHCI, 2005, 4 pages.
Zhong, Lin, "Energy-Efficient Mobile System Design: The User's Perspective", A Dissertation Presented to the Faculty of Princeton University in Candidacy for the Degree of Doctor of Philosophy, Sep. 2005, 184 pages.
Presentation given by Lin Zhong at AT&T Labs in Florham Park, NJ on Sep. 1, 2005, 9 pages.

* cited by examiner

*Primary Examiner*—David Q Nguyen
(74) *Attorney, Agent, or Firm*—Lee & Hayes, PLLC (57) ABSTRACT

A mobile server is wirelessly communicable with at least one remote input/output (I/O) device to form a wireless personal-area network (PAN). The mobile server has at least one application program interface (API) allowing an application of arbitrary implementation on the mobile server to recognize and control at least one service implemented by the remote I/O device.

17 Claims, 6 Drawing Sheets

MAP VIEWER EXAMPLE

FIG. 8

MESSAGE EXAMPLE

FIG. 9

HEALTH MONITOR EXAMPLE

INTERFACING I/O DEVICES WITH A MOBILE SERVER

BACKGROUND

A Smartphone is an electronic mobile device that combines the functionality of a mobile phone with a personal digital assistant (PDA) or other information appliance. Smartphones today have more computing, storage, and connectivity capacity than PCs did ten years ago, yet they provide very limited interfaces with their users and the physical world.

SUMMARY

This Summary is provided to introduce a selection of concepts in a simplified form that are further described below in the detailed description. This Summary is not intended to identify key features or essential features of the claimed subject matter, nor is it intended to be used as an aid in determining the scope of the claimed subject matter.

In view of the above, in one aspect, a mobile server is wirelessly communicable with at least one remote input/output (I/O) device to form a wireless personal-area network (PAN). The mobile server has at least one application program interface (API) allowing an application of arbitrary implementation on the mobile server to recognize and control at least one service implemented by the remote I/O device.

BRIEF DESCRIPTION OF THE DRAWINGS

In the Figures, the left-most digit of a reference number identifies the particular Figure in which the designated component or act first appears.

DETAILED DESCRIPTION

Overview

This disclosure is directed to systems, methods, and devices for interfacing a mobile server, such as a Smartphone, with one or more remote input/output (I/O) devices, and to devices used to implement such systems and methods. The disclosure is also directed to methods of facilitating the development of applications for mobile servers, and to energy management methods usable with the mobile server.

Some of these implementations include application program interfaces (APIs) and/or protocols to facilitate communication between the Smartphone and the I/O devices. The APIs/protocols enable the Smartphone to communicate with, and thus control, its I/O devices through a wireless personal-area network (PAN). These I/O devices serve the Smartphone in a synergistic fashion, collectively providing a user with immediate and more natural access to the computing power of the Smartphone, and enabling more and better services. The wireless PAN for connecting the Smartphone and I/O devices is not limited to a particular wireless technology, though Bluetooth® is used for purposes of exemplary illustration in the described implementations as the wireless PAN technology.

The APIs and I/O devices described are application-independent. This eliminates the requirement that a developer of software for the mobile server know what I/O devices will be connected to the PAN and/or what wireless technology will be used for communication between the mobile server and the I/O devices. Knowing how to call the APIs, developers can write software applications for the Smartphone that can interact with any I/O devices connected to the PAN.

While the technology is described herein in the context of a Smartphone-centered wireless PAN, the technology may be used in other environments and is applicable to other contexts. For example, while Bluetooth is described as the wireless standard, other wireless technologies, such as Zigbee®, Wi-fi, and the like could be used instead or in combination. Moreover, while connections to the PAN are discussed as being wireless, I/O devices may also be connected to the PAN by any conventional wired connection. Also, in addition to or instead of the Smartphone, other types of mobile servers, such as PDAs, mobile email devices, media players, and the like, may be used. Still further, while various specific I/O devices are described, numerous other I/O devices may additionally or alternatively be used with the mobile server.

Smartphone-Centered Wireless PAN

Figure 1:
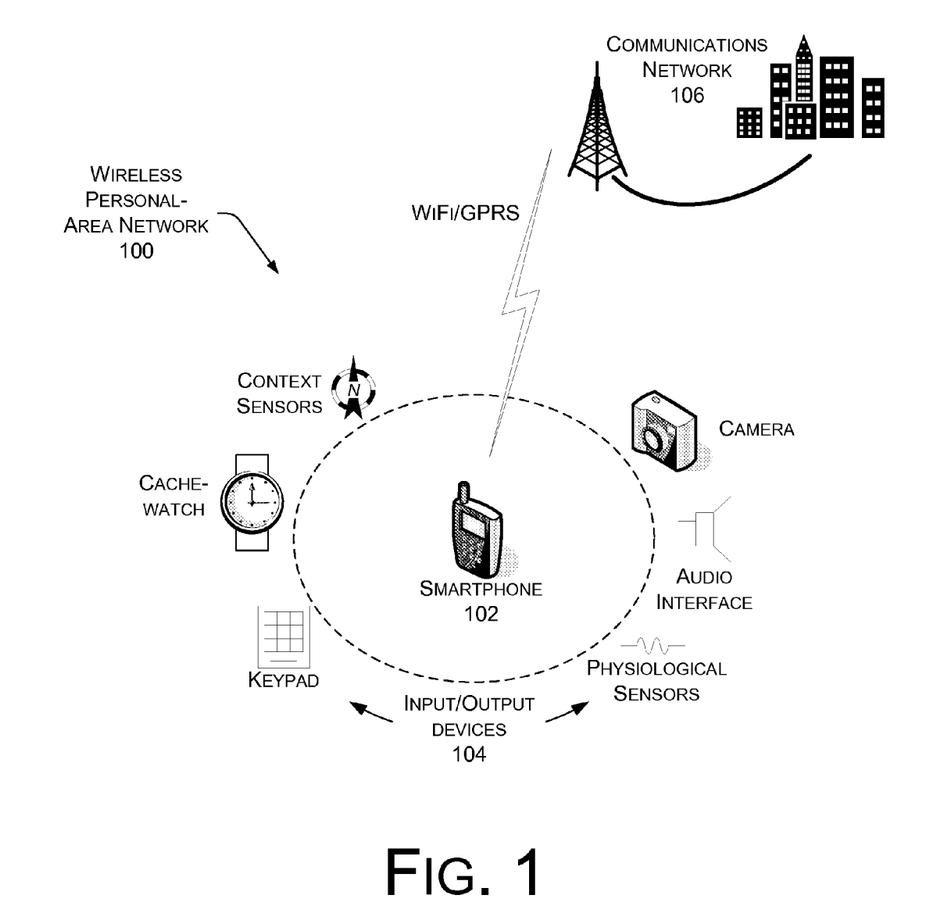
FIG. 1 is a schematic diagram of one exemplary implementation of a Smartphone-centered wireless personal area network (PAN).

FIG. 1 is a schematic of a Smartphone-centered wireless PAN 100, according to one implementation. The PAN includes a master Smartphone 102, which interacts wirelessly with multiple remote I/O devices 104 of the PAN 100 using, for example, Bluetooth wireless technology. The Smartphone 102 also is communicable with a communications network 106, such as a mobile telephone network, via conventional mobile telephone technology. Conventional mobile telephone technology may include WiFi, general packet radio service (GPRS), and the like. The PAN 100 of I/O devices 104 provides multiple convenient ways to interface with, and capitalize on, the computing ability, connectivity, and storage capacity of the Smartphone 102.

The I/O devices 104 typically interact with a human user and/or with the physical environment. Examples of I/O devices that interact with a human user include keypads for textual input, audio interfaces for audio I/O, cameras (still and/or video), displays, multimedia devices, and the like. Examples of I/O devices that interact with the physical environment include context sensors, physiological sensors, and the like. Context sensors include global positioning system (GPS) units, compasses, temperature sensors, barometric pressure sensors, light sensors, accelerometers, and the like. Physiological sensors include heart rate monitors, blood pressure monitors, oxygen monitors, body temperature sensors, and the like. One exemplary I/O device usable with the PAN 100 is a "Cache-watch" having a user interface and a display, as described further below in the section entitled "Exemplary Input/Output Device." Of course, numerous other I/O devices could also be used with the PAN 100 of the described implementations, as will be apparent to those of ordinary skill in the art.

Smartphone

Figure 2:
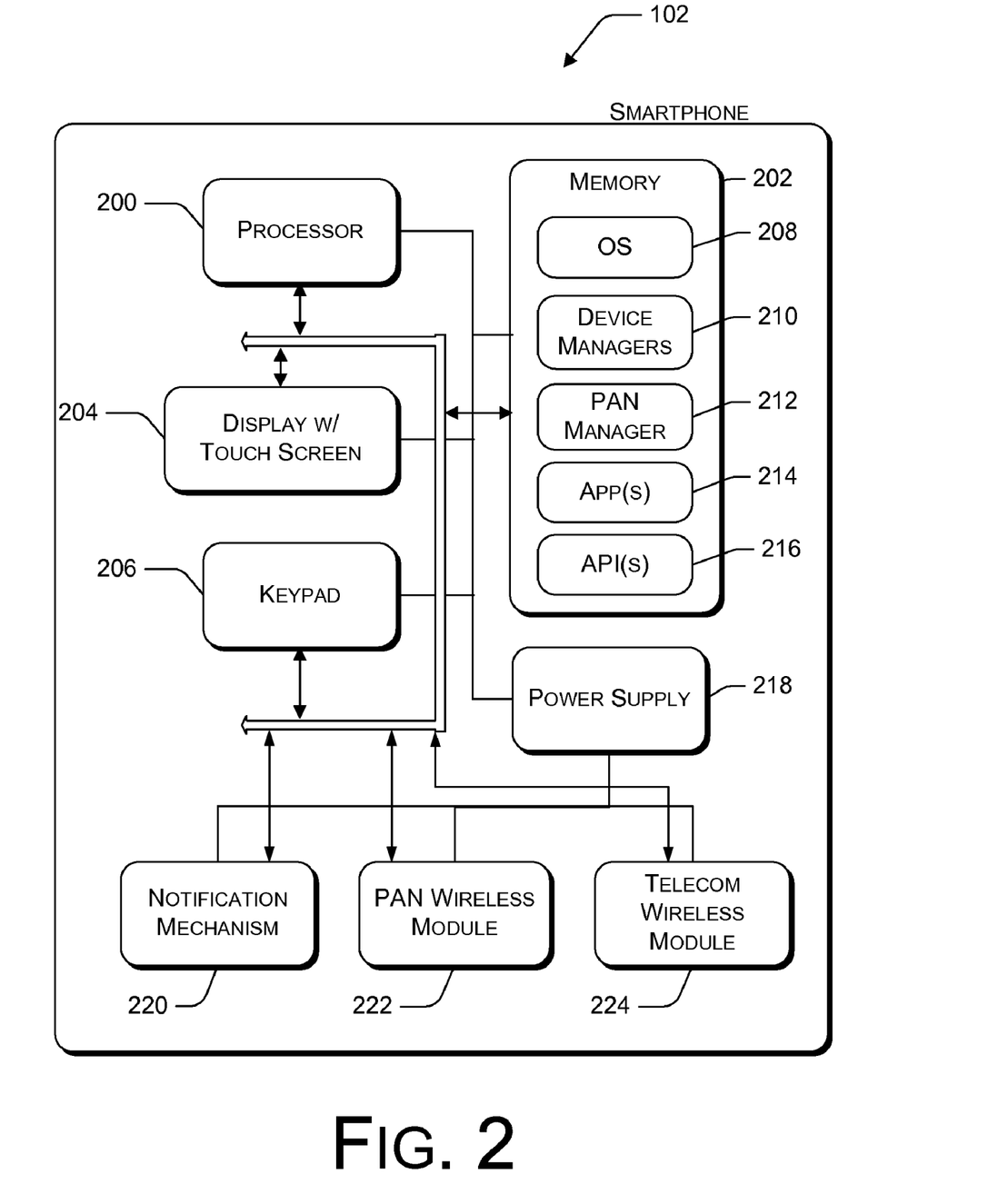
FIG. 2 is a block diagram of an exemplary Smartphone usable with the wireless PAN of FIG. 1.

FIG. 2 illustrates one exemplary implementation of the Smartphone 102. The Smartphone 102 has a processor 200 for implementing logic, a memory 202, a display 204, and a keypad 206. The display 204 may be a liquid crystal display (LCD), or any other type of display commonly used in mobile devices. The display 204 may be touch-sensitive, and would then also act as an input device. The keypad 206 may be a push button numeric dialing pad (such as on a typical telephone), a multi-key keyboard (such as a conventional keyboard), or any other device for inputting textual data.

The memory 202 generally includes both volatile memory (e.g., RAM) and non-volatile memory (e.g., ROM, Flash Memory, or the like). The non-volatile portion of the memory 202 may be used to store persistent information which should not be lost when the Smartphone 102 is powered down. The Smartphone 102 includes an operating system (OS) 208, such as Windows® CE or Windows Mobile® available from Microsoft Corporation, Redmond, Wash., or other OS. The OS is resident in the memory 202 and executes on the processor 200.

The memory 202 also includes one or more device managers 210 and a PAN manager 212 for interacting with one or more I/O devices 104 connected to the PAN 100. The device managers 210 and PAN manager 212 are software installed on the Smartphone 102. A device manager 210 corresponds to each I/O device 104 on the PAN 100. The PAN manager 212 is the interface between the platform and the user and between the platform and the applications using it. The PAN manager 212 coordinates communications between the Smartphone 102 and the I/O devices 104 on the PAN 100, while the device managers 210 interpret raw data received from the I/O devices 104, control the I/O devices 104, and function like device drivers.

One or more application programs 214 are loaded into memory 202 and run on or in association with the operating system 208. Examples of application programs that can be run on the Smartphone 102 include phone dialer programs, email programs, scheduling programs, personal information management (PIM) programs, word processing programs, spreadsheet programs, Internet browser programs, instant messaging programs, GPS and/or mapping programs, health monitoring programs, weather programs, and so forth. Of course, numerous other types of application programs usable on the Smartphone will be apparent to those of ordinary skill in the art. The applications 214 may use and store information in the memory 202, such as e-mail or other messages used by an e-mail application, contact information used by a PIM, appointment information used by a scheduling program, documents used by a word processing program, instant messaging information used by an instant messaging program, maps and waypoints used by the GPS and/or mapping programs, medical information used by the health monitoring program, and the like.

The memory 202 also includes a collection of one or more APIs 216 for facilitating wireless communication between the Smartphone 102 and one or more remote I/O devices 104. The APIs 216 can be invoked by the applications 214 to recognize and control the one or more remote I/O devices 104. In this manner, the Smartphone 102 is able to take advantage of services or functionalities of the one or more remote I/O devices 104.

The Smartphone 102 has a power supply 218, which may be implemented as one or more batteries, fuel cells, or other sources of electrical power. The power supply 218 might further include an external power source, such as an AC adapter or a powered docking cradle, that supplements or recharges the batteries.

The Smartphone 102 may also include one or more audio, visual, and/or vibratory notification mechanisms 220. These notification mechanisms 220 may be directly coupled to the power supply 218 so that when activated, they remain on for a duration dictated by the notification mechanism 220 even though the processor 200 and other components might shut down to conserve energy. Examples of notification mechanisms 220 include one or more LEDs, an audio interface, and a vibration generator. The one or more LEDs, when used, may be programmed to indicate the status of the device (e.g., on, off, charging, incoming call, message waiting, etc.). The audio interface, when used, may provide audible signals to, and receive audible signals from, the user. For example, the audio interface may be coupled to a speaker for providing audible output and to a microphone for receiving audible input, such as to facilitate a telephone conversation. The vibration generator, when used, may be programmed to vibrate to indicate a status of the device (e.g., vibrate when an incoming call or text message is received, when an alarm goes off, etc.).

The Smartphone 102 also includes at least one PAN wireless module 222, such as a Bluetooth module, for transmitting and receiving radio frequency communications with I/O devices 104 of the PAN 100. The radio frequency module may be a KC21 Bluetooth module with integrated chip antenna, manufactured by KC Wirefree LLC of Tempe, Ariz., or any other suitable wireless radio frequency module, such as a ZigBee® module, WiFi module, or the like. In one alternative, the Smartphone 102 may include multiple different PAN radio frequency modules for transmitting and/or receiving different types of communications. For example, the Smartphone 102 might include a Bluetooth module for communications requiring a high data transmission rate, and a Zigbee® module for communications requiring lower data transmission rates. This might be desirable, for example, to minimize power consumption of the Smartphone 102 during wireless communication.

The Smartphone 102 also may include a telecommunications wireless module 224, such as a GPRS or WiFi module, that facilitates wireless connectivity between the Smartphone 102 and the outside world via the communications network 106.

Transmissions to and from each of the radio frequency modules 222, 224 are conducted under control of the operating system 208. In this manner, communications received by the radio frequency modules may be disseminated to application programs 214 via the operating system 208, and vice versa.

Exemplary Input/Output Device

Figure 3:
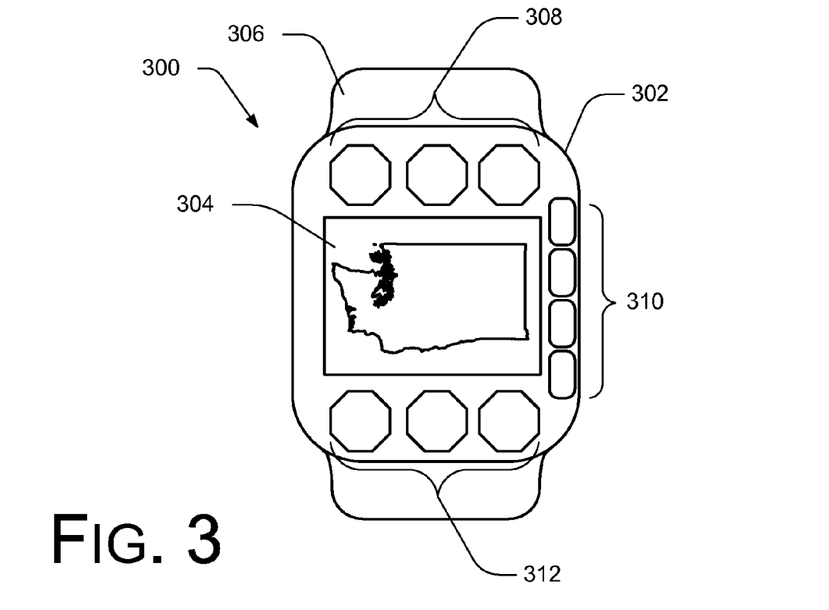
FIG. 3 is a plan view of an exemplary I/O device usable with the wireless PAN of FIG. 1.

FIG. 3 illustrates a Cache-watch 300 as one exemplary I/O device usable with the wireless PAN 100. The Cache-watch 300 provides a convenient, remote interface and display device for interacting with and viewing information from the Smartphone 102. The Smartphone 102 is responsible for substantially all processing related to implementing and running applications to utilize the Cache-watch as an extended display and user interface. This minimizes the processing power and energy consumption of the Cache-watch 300.

The Cache-watch 300 is a wrist-worn display device that, besides functioning as a watch, serves as a remote display for the Smartphone 102. The Cache-watch 300 includes a body 302, in which a liquid crystal display (LCD) 304 is mounted, and a band for securing the body 302 of the Cache-watch 300 to an arm of a user. A user interface comprising a plurality of capacitor touch sensors 308, 310, 312 is provided on the body 302 of the Cache-watch 300 for input by the user. While an LCD display is described, any other type of display may be used as the display of the Cache-watch 300, such as a light emitting diode (LED) display, or the like. Also, while the user interface is described as a plurality of capacitor touch sensors, any number and type of user interface controls could be used, such as one or more buttons, knobs, dials, bezels, a touch screen, and the like. Still further, the Cache-watch 300 may have any features of a conventional watch, such as time, date, alarm, chronograph, illumination, and the like.

In operation, the Cache-watch 300 is configured to receive a full framebuffer from the Smartphone 102 for display on the LCD screen of the Cache-watch 300, without need to further process the received information. In other words, the I/O device is a "dumb" device, configured to display information received from the mobile server and to relay information entered by a user at the user interface to the mobile server, without performing any substantive processing of the information. This is facilitated by a Framebuffer API for the Smartphone 102 to update the Cache-watch's framebuffer directly (the Framebuffer API is described further below in the section entitled "Application Program Interfaces"). In this manner, the Smartphone 102 can directly write into the display 304 of the Cache-watch 300 through the wireless connection. This not only minimizes the energy consumption and hardware cost/complexity for the Cache-watch 300, but also enables the user to interact with the Smartphone 102 through the Cache-watch 300 in real-time. Dumb devices have substantially less computing capacity than does the Smartphone.

Figure 4:
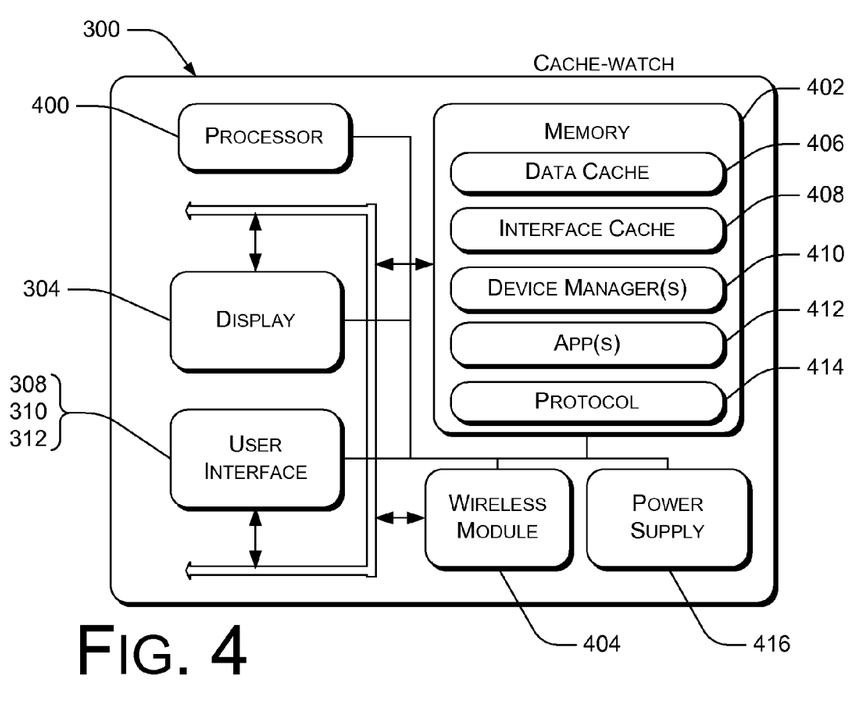
FIG. 4 is a block diagram of the I/O device of FIG. 3, according to one embodiment.

FIG. 4 is a block diagram of internal components of the Cache-watch 300. As shown in that figure, the Cache-watch 300 includes a low power processor 402, memory 402, and a radio frequency module 404. The processor 400 may be TI MSP430F169 ultra lower power micro-processor unit (MPU) manufactured by Texas Instruments of Dallas, Tex.

The radio frequency module may be a KC21 Bluetooth module with integrated chip antenna, manufactured by KC Wirefree LLC of Tempe, Ariz. Of course, another suitable Bluetooth module, or any other type of wireless radio frequency module, such as a ZigBee® module, WiFi module, or the like, could alternatively or additionally be used.

The memory 402 includes data cache 406, for caching received information (e.g., text, icons, pictures, etc.) transmitted from the Smartphone 102, and interface cache 408, for caching user inputs to the user interface for subsequent transmission to the Smartphone 102. Generally, user input is cached only for passive services, such as when the watch is displaying stored messages from the Smartphone. Conversely, user input is generally sent immediately back to the phone for active services, such as when the watch stays connected with the phone and the user interacts with the phone through the watch. Of course, other configurations and techniques of cached and/or immediate communication are possible, and will be readily apparent to one of ordinary skill in the art.

The data cache 406 is partitioned into slots to cache multiple messages from the Smartphone 102. Each slot has meta-data to indicate whether it contains a valid message, how it is to be displayed and what its priority is. The software is extremely simple in that it just displays valid messages based on their meta-data, in accordance with user preference. The data cache 406 is managed and updated according to commands from the user or Smartphone 102. A command can specify both the text message and its meta-data. The cached messages can later be viewed on the Cache-watch 300 without connection to the Smartphone 102.

The memory also includes one or more device managers 410 and applications 412, which may be implemented as multiple independent routines or as a composite routine. The routines on the Cache-watch 300 are implemented as interrupt-driven firmware. The device manager(s) 410 interface with the display 304 and the user interface 308, 310, 312. The application(s) 412 call a handler to implement an application-layer (SYN) protocol 414 to communicate with the Smartphone 102. In this manner, the application(s) 412 can perform the programmed functions and implement instructions from the Smartphone 102 and/or entered by a user at the user interface 308, 310, 312.

More specifically, the I/O device exports its services to the Smartphone through the SYN protocol. Smartphone and/or wireless PAN developers use the Smartphone APIs to access the services of the I/O device. These APIs implement SYN protocol commands to control the I/O device and retrieve data from the I/O device. The SYN protocol is implemented by Smartphone APIs and I/O device firmware. Thus, the developers only program the Smartphone to control I/O devices and access their services remotely.

The display 304 of the Cache-watch 300 has three modes: automatic, manual, and idle. In the automatic mode, cached messages are automatically scrolled across the display 304. A message can be scrolled at different speeds, for different times, and/or blink based on its meta-data. In the manual mode, the user can use the user interface to browse messages, scroll messages, delete messages, and/or make a confirmation. In the idle mode, no message is shown and the display can be turned off. The user can put the display 304 into different modes using the user interface 308, 310, 312. Additionally or alternatively, the Smartphone 102 may put the display 304 into different modes at scheduled intervals, after a period of non-use, in response to user input at the Smartphone 102, or the like.

Power is supplied to the Cache-watch 300 by a conventional power supply 416. It is desirable to minimize the amount of power consumed by the Cache-watch 300, in order to minimize the overall size and weight of the Cache-watch 300. One way that power consumption can be minimized is by minimizing the time that the wireless module 404 of the Cache-watch 300 is turned on.

The wireless connection between the Smartphone 102 and the Cache-watch 300 can be active or passive. Generally, a passive connection is one in which a wireless connection is established at scheduled times, but a connection is not maintained between scheduled communications. In contrast, an active connection is one in which the wireless connection is continuously (or cyclically) maintained, as described further in the section entitled "Wireless Connection and Energy Management."

With a passive connection, applications 214 running on the Smartphone 102 can send bitmap messages to display on the LCD screen 304 of the Cache-watch 300. The messages will be cached in the data cache 406 memory and displayed according to their meta data priority without the Smartphone's control. Also, with a passive connection, user input to the user interface of the Cache-watch 300 is cached and is not communicated to the Smartphone 102 until the next scheduled connection. However, even in the passive mode, the user may initiate an active connection using the user interface of the Cache-watch 300.

With an active connection, applications 214 on the Smartphone 102 may update the framebuffer of the Cache-watch 300 directly through the wireless connection. The framebuffer is typically not saved in the Cache-watch's memory. Rather, it is updated directly by the Smartphone 102. Also during active connection, user input on the Cache-watch 300 is sent immediately to the Smartphone 102.

In the described implementations, the message command is a passive service, while the framebuffer command is an active service. Thus, cached messages can be displayed on the Cache-watch 300 according to the meta data, even when it is disconnected from the Smartphone 102. In contrast, the framebuffer is updated in real-time only when the Cache-watch 300 is actively connected to the Smartphone 102. Of course, messages could be sent using the framebuffer command as well, though this would generally be less energy efficient due to the active connection. In addition, the Cache-watch 300 could be configured to cache framebuffers for off-line viewing as well.

The user interface of the Cache-watch 300 comprises three series of touch sensors 308, 310, and 312. One series of touch sensors 308 is used for switching between the previously-described automatic, manual, and idle modes. The other series of touch sensors 310, 312 are used to manipulate content displayed on the display 304. The function of the touch sensors 308, 310, and 312 may change depending on the type of communication (active or passive) that is established. For example, with passive service, the touch sensors can be used to browse, delete, and confirm cached information, to initiate an active connection, and the like. With active service, the touch sensors can be used to interact with the Smartphone application, scroll vertically and horizontally, select items from a list, and the like. The Smartphone 102 interprets the touch sensor inputs and updates the display 304 accordingly. These and other commands can be implemented using the user interface of the described implementation.

Wireless Connection and Energy Management

Typically, to establish a connection between two Bluetooth equipped devices, one of them has to initiate the connection by "Paging" the other. Paging devices are called active devices. The other device must "Page Scan" to identify and accept the Paging of the active device to establish the connection. Page Scanning devices are called passive devices. Both Paging and Page Scan are carried out in sessions. Bluetooth power consumption is the most significant use of energy in both the Smartphone 102 and the I/O devices 104. For example, the Cache-watch 300 described herein consumes less than about 1 mA@3.3V when Bluetooth is off, but consumes about 25 mA@3.3V when seeking connection and about 30 mA@3.3V when transferring data.

Accordingly, it is desirable to minimize the amount of time that the Smartphone and I/O devices spend Paging and Page Scanning, as well as the time spent actually transmitting and/or receiving data.

Figure 5:
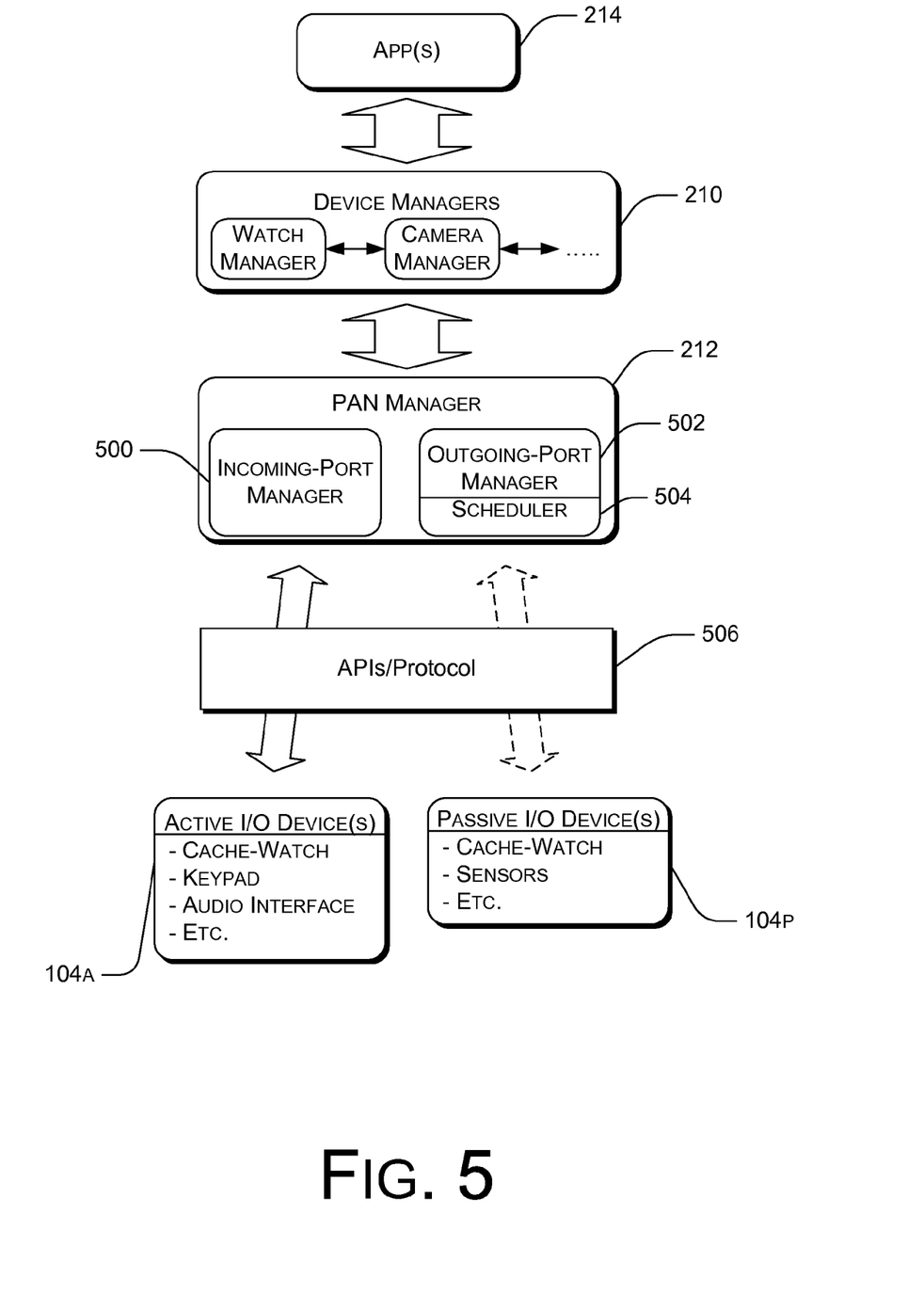
FIG. 5 is a schematic diagram showing exemplary interactions between parts of a wireless PAN.

FIG. 5 is a block diagram conceptually illustrating the wireless connection between the device managers 210, PAN manager 212, and applications 214 of the Smartphone 102 and the I/O devices 104 using a collection of APIs 506. The collection of APIs/protocol 506 may include APIs 216 for communications from the Smartphone 102 to the I/O devices 104 and/or application-layer protocol 414 for communications from the I/O devices 104 to the Smartphone 102. Generally, the PAN manager 212 interacts with the device managers 210 to manage communications between the Smartphone 102 and the I/O devices 104, and includes an incoming-port manager 500 and an outgoing-port manager 502.

The incoming-port manager 500 controls the connections of the Smartphone 102 with active I/O devices 104a, such as the audio interface and keypad. The incoming-port manager 500 causes the Smartphone 102 to enter a Page-Scan session periodically to catch possible Paging from the active I/O devices 104a. Once a connection is established with a Paging I/O device 104a, the corresponding device manager 210 is called.

The outgoing-port manager 212 controls connections of the Smartphone 102 with passive I/O devices 104p, such as the cache-watch and context and physiological sensors. Some communication delay between the Smartphone 102 and passive I/O devices 104p is usually tolerable. Therefore, the outgoing-port manager 212 schedules the communications to share the port among all passive I/O devices 104p. The corresponding device managers 210 can run even when there is no established connection between the Smartphone 102 and the passive I/O device 104p. The device managers 210 corresponding to the passive I/O devices 104p interact with applications 214, and send requests for connection to a scheduler 504. The outgoing-port manager 502 buffers these requests and the scheduler 504 schedules the requested connection accordingly. When a connection to a passive I/O device 104p is scheduled, the outgoing-port manager 502 causes the Smartphone 102 to enter a Paging session for a certain period of time or until the connection with that device is established.

For passive I/O devices, the Bluetooth module consumes most of its energy in the Page-Scan sessions since data communication is usually very brief. Fortunately, in the described implementations, the Smartphone 102 knows when it needs to talk to a passive I/O device 104p from the outgoing-port scheduler 504. When the Smartphone 102 is connected to a passive I/O device 104p, the outgoing-port manager 502 predicts when the Smartphone 102 will seek communication with the passive I/O device 104p again based on history and/or a predetermined schedule. The outgoing-port manager 502 then notifies the passive I/O device 104p of the next scheduled connection time just before disconnecting using a Send Power API. The passive I/O device 104p will keep its Bluetooth module powered down until just before the next scheduled communication. The Smartphone 102 manages its own Bluetooth in substantially the same manner. Such an arrangement minimizes the time passive devices spend in Paging/Page Scan modes. The Smartphone 102 and I/O devices 104p may enter a Paging/Page-Scan session periodically to re-synchronize when/if they lose synchronization, or when requested by a user (e.g., when a user requests information using the interface of the Cache-watch).

Active I/O devices 104a typically seek connection with the Smartphone 102 whenever the user requests interaction. Lengthy connection latency between the Smartphone 102 and active I/O device 104a is, therefore, undesirable. Generally, latency of between about 400 ms and about 2000 ms is desirable. To avoid longer latency, the Bluetooth module of the Smartphone 102 would need to stay in a Page Scan session all the time, which would put a significant drain on the battery. To minimize connection latency, while at the same time maximizing battery life, the Smartphone 102 can be configured to enter a Page-Scan session at short intervals. For example, the Smartphone 102 can be configured to enter a Page Scan session for two seconds, every four seconds. This configuration reduces the energy consumption of the Smartphone by approximately half, while only increasing connection latency by two seconds. Of course, the specific Page Scan duration and the interval between consecutive Page Scans can be varied to achieve a desired balance between connection latency and battery life. Moreover, users can manually start or stop the Smartphone Bluetooth Page Scan session to realize even further energy savings.

Using the foregoing energy management methods, the Cache-watch 300 spends about 90% of the time with the Bluetooth module powered off (during which time the Cache-watch consumes less than about 1 mA@3.3V), spends less than about 1 second Page Scanning for each scheduled connection (during which time the Cache-watch consumes about 25 mA@3.3V), and spends only about 1% of the time transferring data (during which time the Cache-watch consumes about 30 mA@3.3V). In addition, even when the Cache-watch is operating in an active mode, power consumption is minimal because the communications are not data-intensive (e.g., approximately only 1.6 KB per user input).

Application Program Interfaces (APIs)

The implementations described herein use a collection of APIs 506 that implement an application-layer protocol for the Smartphone-centered PAN 100. The protocol works with any wireless technology that can transmit digital data, and is not limited to the Bluetooth technology used in the described implementations. The APIs encapsulate the services available on I/O devices 104 of the PAN 100, and the controls by the master Smartphone 102, into function calls. The APIs can be made available to developers as binary libraries and header files, or in any other suitable format. Any arbitrary Smartphone application can access the I/O device services and avail themselves of these services by calling these APIs properly. The APIs return 0 upon success, a negative integer when there is a problem with the SOCKET, and a positive integer in other cases. Thus, application developers for the Smartphone need not know the details of the PAN 100 or the I/O devices 104 that may be connected thereto to write applications for the Smartphone 102. Simply knowing the collection of APIs allows developers to write applications for the Smartphone that can avail themselves of the services and functionalities of the I/O devices.

The collection of APIs/protocol 506 comprises an application-layer, SYN protocol for the Smartphone 102 to communicate with the I/O devices 104. In the described implementation, the Smartphone 102 uses the Winsocket interface for wireless and the I/O devices 104 use universal asynchronous receiver-transmitters (UARTs) for wireless. On the Smartphone, the SYN protocol is implemented with the Winsocket APIs, while on the I/O devices, the SYN protocol is implemented using the UARTs. Of course, other types of interfaces and wireless receivers-transmitters may additionally or alternatively be used.

The Smartphone and the I/O devices on the PAN exchange information using byte-based commands. Each command comprises a two-byte header, a third-byte for command type, command data of any size, and a two-byte tail.

There are nine types of commands implemented by corresponding APIs 216 and/or protocol 414. These commands include: Receive, Instruction, Power, Framebuffer, Message, Response, User Input, Acknowledgement, and Sensor Data. The Receive, Instruction, Power, Framebuffer, Message, and Ack commands are directed from the Smartphone to the I/O devices. The User Input, Response, and Sensor Data commands are directed from an I/O device to the Smartphone. The commands and the APIs corresponding to each are described below.

Receive Command

The API corresponding to the Receive command is the Receive API. The Receive API will retrieve a command from an I/O device, generally a passive I/O device. The API will block until a complete command is received. That is, the thread controlling the API cannot be preempted for priority-based scheduling, etc. Rather, the API will wait (block) for a response prior to dropping the connection.

Instruction Command

The API corresponding to this command is the Instruction or Send Instruction API. There are three types of instructions: Go Active, Go Automatic, and Get Data. The first two instructions are used to switch the Cache-watch or other I/O device between service modes (e.g., active, automatic, and idle, as discussed above in the section entitled "Exemplary Input/Output Device"). The third instruction is used to order sensor data from one or more context and/or physiological sensor I/O devices.

Power Command

The API corresponding to this command is the Power or Send Power API. Power commands instruct an I/O device, usually the wireless module of the I/O device in particular, to get into a certain power mode for a certain period of time. Power commands may include: Active Mode, Hold Mode, Sniff Mode, Park Mode, and Disconnected Mode. During communication an I/O device is in the Active power mode. Upon receiving the Disconnected command, an I/O device will power its wireless module off for the specified period of time. In the described implementations, only the Active and Disconnected power modes are used. However, one of ordinary skill in the art will recognize that other power modes may be used to control various I/O devices.

Framebuffer Command

The API corresponding to this command is the Framebuffer or Send Framebuffer API. A command of this type sends a full framebuffer to an I/O device, such as the Cache-watch, to display immediately. The framebuffer is typically not stored in memory of the I/O device, and is updated by the Smartphone. This command can specify not only the data source, but also format data of the framebuffer, such as the number of rows and columns for the framebuffer. Thus, this command may be display-specific. In the described implementations, each row contains 8 rows of pixels. Framebuffer commands could also be used to transmit messages. However, this would be more power intensive due to the active nature of the connection during update of the framebuffer.

Message Command

The API corresponding to this command is the Message or Send Message API. This command is used by the Smartphone send a text message to the Cache-watch, or other I/O device. The Message command is in the format:

Header (2 bytes)+Type (1 byte)+slot_num(1 byte)+meta_data(1 byte)+length(1 byte)+TXT_MSG (length bytes)+Tail (2 bytes)

The slot_num specifies which memory slot of the Cache-watch or other I/O device is used to store this message. Thus, this command may also be display-specific. The meta_data specifies the priority and other information of the message. Messages can be displayed on the I/O device according to the user preference (e.g., scrolling message, blinking message, frequency or rate of scrolling or blinking) entered on a user interface of the I/O device.

Response Command

The Response command is implemented by the SYN protocol on an I/O device, and is not currently used in the described implementation. However, it should be understood that the Response command can be used by a remote I/O device to confirm that the I/O device has successfully received a command from the Smartphone.

User Input Command

The User Input command is implemented by the SYN protocol on an I/O device, and is used to transmit user input entered at the user interface of an I/O device, such as the Cache-watch, to the Smartphone. In the described implementation of the Cache-watch, the User Input commands include scroll left, scroll right, scroll up, scroll down, page left, page right, page up, page down, and exit. Each of the operations corresponds to a different button of the user interface of the Cache-watch. Of course, the specific operations corresponding to the User Input commands will depend on the configuration of the user interface that a given I/O device has and the services offered by the I/O device. Thus, this command may be device-specific.

Acknowledgment (Ack) Command

The API corresponding to the Ack command is the Acknowledgment or Ack API. This command has not yet been used with the described implementations. However, it should be understood that the Ack command can be used by the Smartphone to acknowledge to a remote I/O device that the Smartphone has received a command from the I/O device.

Sensor Data Command

The Sensor Data command is implemented by the SYN protocol on an I/O device, and is used by a wireless I/O device to send its data to the Smartphone. Commands of this type may take the format:

Header(2 bytes)+Type (1 byte)+Data_size (1 byte)+Sensor data (Data_size bytes)+Tail (2 bytes)

The program calls for the foregoing APIs are as follows:
(1) Receive API—int SYN_Receive(SOCKET s, char *buffer);
(2) Send Instruction API—int SYN_SendInstruction (SOCKET s, InstructionType inst);
(3) Send Power API—int SYN_SendPower(SOCKET s, PowerMode mode, unsigned int btSleep);
(4) Framebuffer API—int SYN_SendFrameBuffer (SOCKET s, char *framebuffer,int row_num, int col_num);
(5) Message API—int SYN_SendMessage(SOCKET s, CString str, int slot, char meta);
(6) Acknowledgment API—int SYN_SendACK (SOCKET s, int ack).

As previously mentioned, the APIs are callable by applications configured to run on the mobile server to interact with I/O devices that are in wireless communication with the mobile server. Access to these APIs gives developers everything they need to develop applications for the Smartphone that can interact with (i.e., use the services of and communicate with) I/O devices in wireless communication with the Smartphone, without knowledge of what, if any, I/O devices will be in wireless communication with the mobile server. Thus, releasing these APIs to developers facilitates development of all sorts of applications for the Smartphone.

In the described implementation, the Response, User Input or Watch Input, and Sensor Data commands from the I/O device to the Smartphone do not have corresponding APIs. Rather, they are interpreted by the Receive API on the Smartphone. Thus, applications running on the Smartphone call the Receive API to get commands from the I/O devices. The APIs are invoked as responses to user input or phone instructions. For example, I/O devices send User Input commands back to the Smartphone when a user presses buttons on a user interface of the I/O device. The I/O devices send Sensor Data commands back to the phone after receiving an Instruction command from the Smartphone.

The foregoing applications, protocols, commands, and APIs can be stored on some form of computer-readable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules, protocols, APIs, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information. Communication media typically embodies computer-readable instructions, data structures, program modules, protocols, APIs, or other data in a modulated data signal such as a carrier wave or other transport mechanism and includes any information delivery media. The term "modulated data signal" means a signal that has one or more of its characteristics set or changed in such a manner as to encode information in the signal. Combinations of the any of the above should also be included within the scope of computer readable media.

Exemplary Method of Communication

Figure 6:
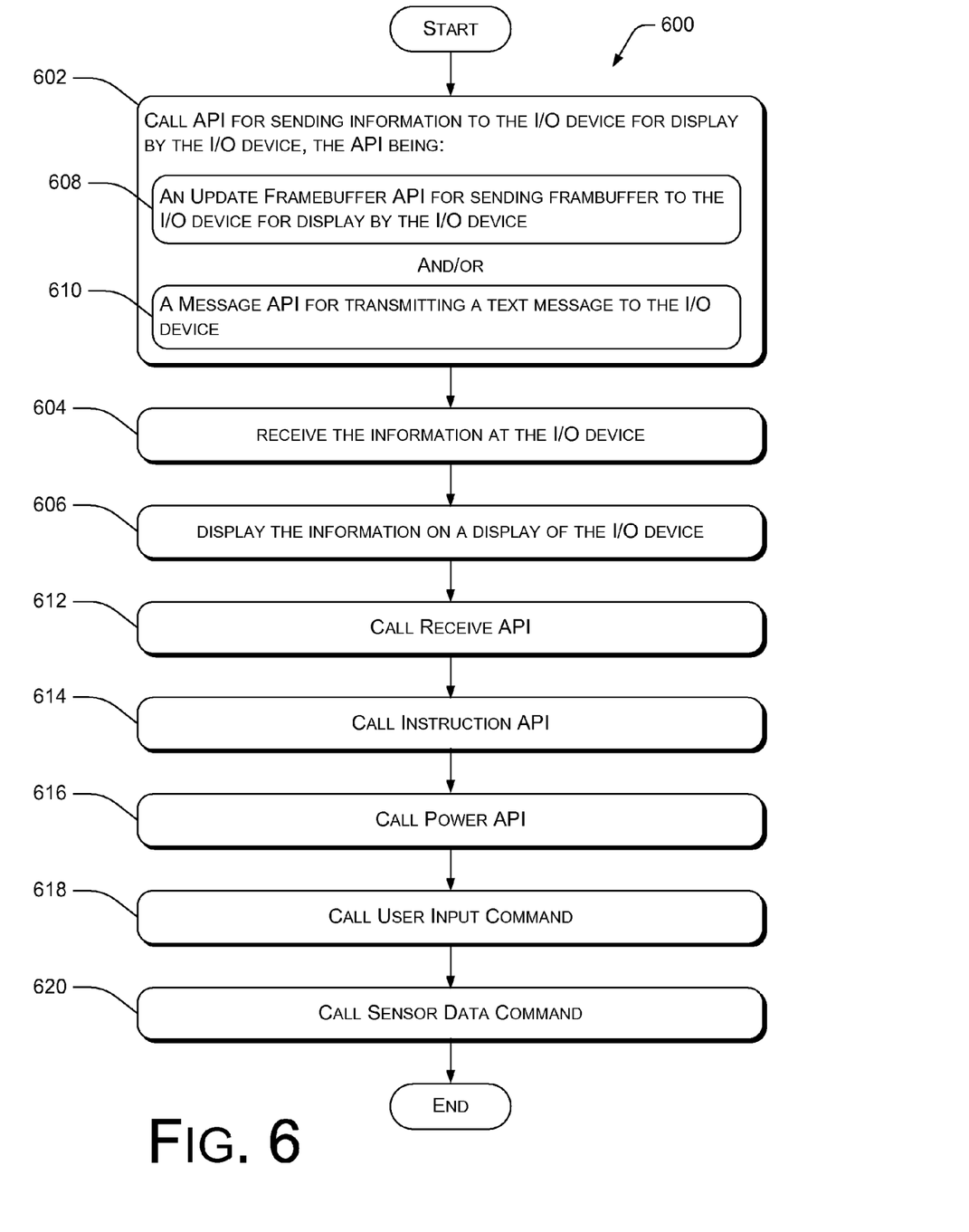
FIG. 6 is a flowchart showing an exemplary method of wireless communication in a wireless PAN.

FIG. 6 illustrates an exemplary method 600 of wireless communication between a Smartphone or other mobile server and an I/O device. The method 600 is at least partially implemented by an application running on the mobile server, and may be implemented by calling one or more APIs or commands. At 602, the method calls an API for sending information to the I/O device for display by the I/O device. At 604, the I/O device receives the information sent by the API. At 606, the information is displayed on a display of the I/O device.

In one implementation, as shown at 608, the called API comprises an Update Framebuffer API, for sending a full frambuffer to the I/O device for display by the I/O device. In this manner, the Smartphone can write directly to the display of the I/O device substantially immediately, without further processing. The Update Framebuffer API also sends a number of rows and columns of the frambuffer along with the source data of the framebuffer.

In another implementation, shown at 610, the called API alternatively or additionally comprises a Message API for transmitting a text message from the Smartphone to the I/O device. The text message includes at least one of an indication of a memory slot of the I/O device to store the message in, and an indication of a priority of the message.

At 612, a Receive API is called for retrieving a command from the I/O device to the Smartphone. The Receive API may block until a complete command is received.

At 614, an Instruction API is called for sending an instruction from the Smartphone to the I/O device, the instruction being an instruction to switch a mode of the I/O device or an instruction to order sensor data from the I/O device.

At 616, a Power API is called for instructing the I/O device to implement a power mode for a period of time until a next scheduled communication between the mobile server and the I/O device.

At 618, a User Input command is called for forwarding from the I/O device to the mobile server information entered by a user on a user interface of the I/O device.

At 620, a Sensor Data command is called for forwarding sensor data from the I/O device to the mobile server at predetermined intervals previously scheduled by the mobile server and transmitted to the I/O device, or in response to a request from the mobile server for sensor data.

Methodological acts 602 and 612-616 are initiated by the Smartphone to send/request information to/from the I/O device, while acts 604, 606, 618 and 620 are initiated by the I/O device to send/request information to/from the Smartphone.

Exemplary Uses

Figure 7:
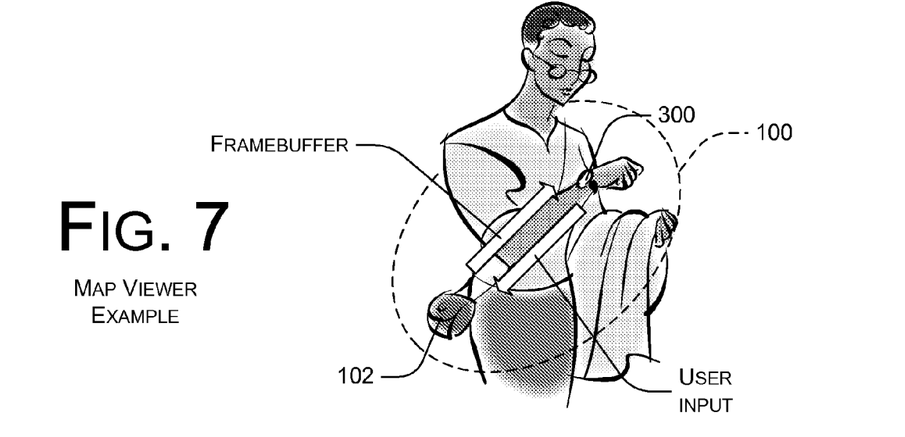
FIG. 7 is a schematic view of an exemplary method of using a Smartphone-centered wireless PAN.

FIG. 7 is a schematic view of an exemplary system employing a Smartphone-centered wireless PAN 100, for illustrating exemplary uses of the system. As shown in the figure, a user carries a Smartphone 102 in a bag or other location out of immediate access. The user also wears a Cache-watch 300 or other I/O device. With the exemplary system of FIG. 7, the user can view and interact with an application running on the Smartphone 102 by using the user interface of the Cache-watch 300. In one specific example, a GPS Map-viewing application running on the Smartphone 102 utilizes the "Framebuffer" API to display and update a map on the Cache-watch. In this example, the wireless connection between the Smartphone 102 and the Cache-watch 300 is maintained during the interaction. That is, the connection is active, as indicated by the solid arrows. The Smartphone 102 updates the framebuffer by writing directly to the framebuffer. The user can browse the map using the Cache-watch interfaces, and can interact with the applications on the Smartphone 102 via the Cache-watch 300. Thus, the Cache-watch 300 serves as a remote interface and display for the Smartphone 102.

Figure 8:
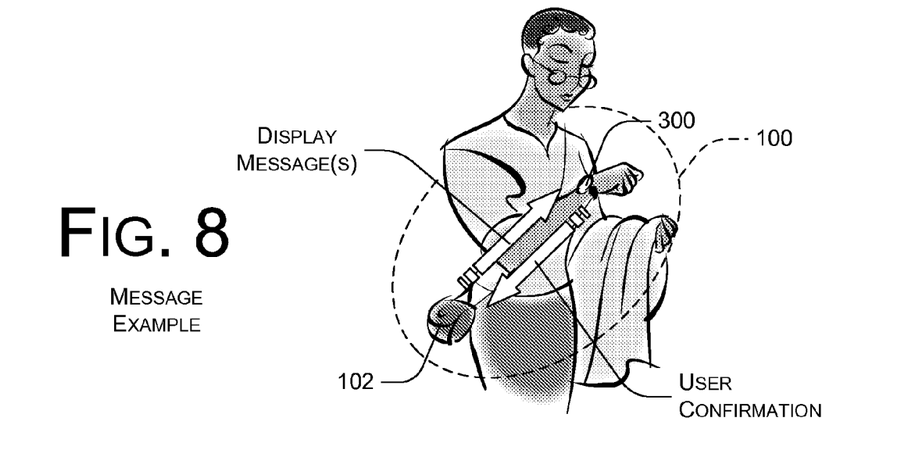
FIG. 8 is a schematic view of another exemplary method of using a Smartphone-centered wireless PAN.

FIG. 8 illustrates another exemplary method of using a Smartphone-centered PAN 100. The PAN 100 in this figure is substantially the same as the one described with respect to FIG. 7. In this exemplary method, a personal information manager (PIM) application, such as Outlook Pocket PC, is running on the Smartphone 102. The PIM application sends reminder and/or notification information to the Cache-watch 300 using the "Send Message" API. In this example, the wireless connection is not maintained. That is, the connection is passive, as indicated by the dashed arrows, and the Smartphone 102 informs the Cache-watch 300 when the next communication will be. In this example, the PIM application sends information to the Cache-watch device manager running on the Smartphone 102. The device manager functions like a device driver but runs as a middleware instead of a kernel module. The Cache-watch device manager buffers information from different applications, and sends the information out through the Send Message API and empties its buffer according to the communication schedule for the Smartphone 102 and Cache-watch 300.

Figure 9:
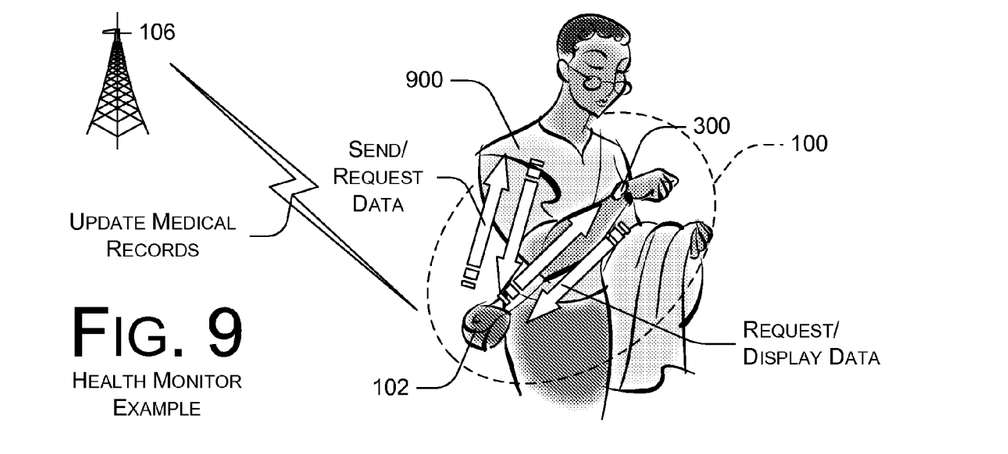
FIG. 9 is a schematic view of yet another exemplary method of using a Smartphone-centered wireless PAN.

FIG. 9 illustrates another exemplary method of using a Smartphone-centered PAN 100. The PAN 100 in this figure is substantially the same as the one described with respect to FIG. 7, except that the user also wears one or more physiological sensors 900. An exemplary location of the sensors is shown in this figure. However, it should be understood that the actual sensors 900 may be positioned under the user's clothing in contact with the user's skin.

In this exemplary method, a Personal Health Monitoring (PHM) application runs on the Smartphone 102 and uses the "Send Instruction" API to collect physiological information from physiological sensors 900. In this example, the wireless connection between the Smartphone 102 and both the Cache-watch and the physiological sensors 1000 is not maintained. That is, the connections are passive, as indicated by the dashed arrows. The Smartphone 102 informs the Cache-watch 300 when the next communication will be. The PHM application can send the information collected from the physiological sensors 900 to medical centers through the GPRS or WiFi connection on the Smartphone 102. Additionally or alternatively, the Smartphone 102 can analyze the information locally and send results to the Cache-watch 300 for immediate review by the user. The Smartphone 102 may alert the user at the Cache-watch 300 (by, for example, a visual alert on the display 304 and/or the alarm of the cache watch 300) if an abnormality is identified.

Numerous other methods of using a system including a Smartphone-centered wireless PAN according to the described implementations will be apparent to those of ordinary skill in the art.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims. For example, the methodological acts need not be performed in the order or combinations described herein, and may be performed in any combination of one or more acts.

Also, while some implementations are described with respect to wireless communication between a mobile server and a single I/O device, the implementations are applicable to communication between any number of mobile servers and I/O devices. Additionally, mobile servers and I/O devices are not mutually exclusive. Thus, while in some implementations the I/O devices are described as being dumb devices, there may be instances where a mobile server may act as an I/O device of another mobile server.

What is claimed is:

1. A mobile server wirelessly communicable with at least one remote input/output (I/O) device to form a wireless personal-area network (PAN), the mobile server comprising:

at least one application program interface (API) allowing an application of arbitrary implementation on the mobile server to recognize and control at least one service implemented by the remote I/O device, wherein the at least one API allows the application to interact with the remote I/O device to:

send at least one of data and commands to the remote I/O device;

receive at least one of data and commands from the I/O device, and wherein the at least one API comprises an Update Framebuffer API configured to send data in the form of a framebuffer to the remote I/O device for display by the remote I/O device when the Update Framebuffer API is called by the application, the framebuffer comprising source data and format data of the framebuffer, such that the remote I/O device can display the framebuffer information substantially immediately without further processing.

2. The mobile server of claim 1, further comprising a Receive API configured to retrieve commands from an I/O device to the mobile server when the Receive API is called by the application.

3. The mobile server of claim 1, further comprising an Instruction API configured to send an instruction from the mobile server to the remote I/O device when the Instruction API is called by the application.

4. The mobile server of claim 1, further comprising a Power API configured to instruct the remote I/O device to implement a power mode for a period of time until a next scheduled communication between the mobile server and the remote I/O device when the Power API is called by the application.

5. The mobile server of claim 1, further comprising a Message API configured to send data in the form of a text message from the mobile server to the remote 110 device when the Message API is called by the application, wherein the text message that the Message API is configured to send comprises at least one of an indication of a memory slot of the remote 110 device to store the message in, and an indication of a priority of the message.

6. The mobile server of claim 1, further comprising an Acknowledgement API configured to acknowledge that the mobile server has successfully received a command from the remote I/O device, when the Acknowledgement API is called by the application.

7. One or more computer storage media encoded with instructions capable of being executed by a processor for allowing an application of arbitrary implementation on a mobile server to recognize and control at least one service implemented by a remote input/output (I/O) device, the instructions including at least one application program interface (API) configured to perform acts comprising:

sending at least one of data and commands to the remote I/O device;

receiving at least one of data and commands from the I/O device, and wherein the at least one API comprises a Message API configured to send data in the form of a text message from the mobile server to the remote I/O device when the Message API is called by the application, wherein the text message that the Message API is configured to send comprises at least one of an indication of a memory slot of the remote I/O device to store the message in, and an indication of a priority of the message.

8. The one or more computer storage media of claim 7, further comprising a Receive API configured to retrieve commands from an I/O device to the mobile server when the Receive API is called by the application.

9. The one or more computer storage media of claim 7, further comprising an Instruction API configured to send an instruction from the mobile server to the remote I/O device when the Instruction API is called by the application.

10. The one or more computer storage media of claim 7, further comprising a Power API configured to instruct the remote I/O device to implement a power mode for a period of time until a next scheduled communication between the mobile server and the remote I/O device when the Power API is called by the application.

11. The one or more computer storage media of claim 7, further comprising an Update Framebuffer API configured to send data in the form of a framebuffer to the remote I/O device for display by the remote I/O device when the Update Framebuffer API is called by the application, the framebuffer comprising source data and format data of the framebuffer, such that the remote I/O device can display the framebuffer information substantially immediately without further processing.

12. The one or more computer storage media of claim 7, further comprising an Acknowledgement API, which is configured to acknowledge that the mobile server has successfully received a command from the remote I/O device, when the Acknowledgment API is called by the application.

13. A mobile server wirelessly communicable with at least one remote input/output (110) device to form a wireless personal-area network (PAN), the server comprising:

interface means for allowing an application of arbitrary implementation on the mobile server to recognize and control at least one service implemented by the remote I/O device, wherein the interface means includes means for:

sending at least one of data and commands to the remote I/O device;

receiving at least one of data and commands from the I/O device, and wherein the interface means comprises at least one of:

framebuffer means for sending data in the form of a framebuffer to the remote 110 device for display by the remote 110 device when the framebuffer means is called by the application, the framebuffer comprising source data and format data of the framebuffer, such that the remote 110 device can display the framebuffer information substantially immediately without farther processing; and message means for sending data in the form of a text message from the mobile server to the remote 110 device when the message means is called by the application, wherein the text message that the message means is configured to send comprises at least one of an indication of a memory slot of the remote 110 device to store the message in, and an indication of a priority of the message.

14. The mobile server of claim 13, wherein the interface means further comprises receiving means for retrieving commands from an I/O device to the mobile server when the receiving means is called by the application.

15. The mobile server of claim 13, wherein the interface means further comprises instructions means for sending an instruction from the mobile server to the remote 110 device when the instruction means is called by the application.

16. The mobile server of claim 13, wherein the interface means further comprises power means for instructing the remote I/O device to implement a power mode for a period of time until a next scheduled communication between the mobile server and the remote I/O device when the power means is called by the application.

17. The mobile server of claim 13, wherein the interface means further comprises acknowledgment means for acknowledging that the mobile server has successfully received a command from the remote I/O device, when the response means is called by the application.

* * * * *